(12) United States Patent (10) Patent No.: US 11,798,056 B2
Hong et al. (45) Date of Patent: *Oct. 24, 2023

(54) SYSTEMS AND METHODS FOR INTELLIGENT EXTRACTION OF QUANTITIES FROM PRODUCT TITLES

(71) Applicant: COUPANG CORP., Seoul (KR)

(72) Inventors: Joon Shik Hong, Seoul (KR); Seong Jin Lee, Seoul (KR); Han Byul Bang, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/523,807

(22) Filed: Nov. 10, 2021

(65) Prior Publication Data

US 2022/0261869 A1 Aug. 18, 2022

Related U.S. Application Data

(63) Continuation of application No. 17/175,386, filed on Feb. 12, 2021, now Pat. No. 11,200,612.

(51) Int. Cl.
*G06Q 30/00* (2023.01)
*G06Q 30/0601* (2023.01)
(Continued)

(52) U.S. Cl.
CPC ....... *G06Q 30/0627* (2013.01); *G06F 40/289* (2020.01); *G06Q 10/087* (2013.01)

(58) Field of Classification Search
CPC ....................................... G06Q 30/0601–0645
(Continued)

(56) References Cited

U.S. PATENT DOCUMENTS 8,812,371 B1 8/2014 Stephens et al.
9,152,990 B1 10/2015 Kanter et al.
(Continued)

FOREIGN PATENT DOCUMENTS

KR 10-1612482 4/2016
KR 10-2019-0115510 10/2019

OTHER PUBLICATIONS

Abaydulla, Anvar. "Grouping Techniques to Manage Large-Scale Multi-Item Multi-Echelon Inventory Systems." Order No. 10248469 University of Arkansas, 2016. Ann Arbor: ProQuest. Web. Sep. 26, 2022. (Year: 2016).*
(Continued)

*Primary Examiner* — Michael Misiaszek
*Assistant Examiner* — Kennedy Gibson-Wynn
(74) *Attorney, Agent, or Firm* — Finnegan, Henderson, Farabow, Garrett & Dunner LLP

(57) ABSTRACT

Some aspects of the present disclosure are directed to computerized methods for extracting attributes from product titles. The method may include: retrieving first product identifier comprising at least one tag; determining, based on the at least one tag, a number of quantity related tags; flagging the product identifier as having a quantity based on an analysis of the quantity related tags; comparing the at least one tag and quantity of the first product identifier with at least one tag and quantity associated with a second product identifier; generating, based on the comparison, at least one similarity value between the first product identifier and the second product identifier; and transmitting instructions to at least one user device, wherein the instructions cause the at least one user device to display the at least one similarity value.

20 Claims, 11 Drawing Sheets

(51) Int. Cl.
*G06Q 10/087* (2023.01)
*G06F 40/289* (2020.01)

(58) Field of Classification Search
USPC .............................................. 705/26.1–27.2
See application file for complete search history.

(56) References Cited

U.S. PATENT DOCUMENTS

| | | | |
|---|---|---|---|
| 9,830,635 B1* | 11/2017 | Levy | G06Q 30/0641 |
| 10,235,711 B1 | 3/2019 | Koduvayur Viswanathan | |
| 10,438,264 B1 | 10/2019 | Viswanathan | |
| 2012/0005222 A1* | 1/2012 | Bhagwan | G06V 30/224 |
| | | | 707/769 |
| 2013/0262979 A1 | 10/2013 | Gu et al. | |
| 2015/0161704 A1* | 6/2015 | Lempel | G06Q 30/0639 |
| | | | 705/26.64 |
| 2017/0186070 A1 | 6/2017 | Dong | |
| 2017/0278147 A1 | 9/2017 | Gaikwad et al. | |
| 2018/0101893 A1 | 4/2018 | Dagan et al. | |
| 2018/0341998 A1 | 11/2018 | Amarthaluri et al. | |

OTHER PUBLICATIONS

Pryzant, Reid, Youngjoo Chung, and Dan Jurafsky. "Predicting Sales from the Language of Product Descriptions." eCOM@ SIGIR 2311 (2017). (Year: 2017).*

Notice of Preliminary Rejection dated Aug. 2, 2022, by the Korean Intellectual Property Office in counterpart Korean Application No. 10-2021-0149230, 11 pages.

International Search Report and Written Opinion dated Nov. 9, 2021, in counterpart PCT International Application No. PCT/IB2021/052032, 9 pages.

Rabin, A V, and A A Petrushevskaya. "Development of the Formal Model for the Presentation of Poorly Structured and Unstructured Information." IOP Conference Series: Materials Science and Engineering, IOP Publishing, May 1, 2020, iopscience.iop.org/article/10.1088/1757-899X/862/5/052076 (2020).

Notice of Allowance dated Oct. 19, 2022, by the Korean Intellectual Property Office in counterpart Korean Application No. 10-2021-0149230, 10 pages.

International Preliminary Report dated Aug. 15, 2023, in counterpart PCT International Application PCT/IB2021/052032, 7 pages.

* cited by examiner

SYSTEMS AND METHODS FOR INTELLIGENT EXTRACTION OF QUANTITIES FROM PRODUCT TITLES

CROSS-REFERENCE TO RELATED APPLICATIONS

This application is a continuation of U.S. patent application Ser. No. 17/175,386, filed Feb. 12, 2021, currently pending and allowed, the disclosure of which is expressly incorporated herein by reference in its entirety.

TECHNICAL FIELD

The present disclosure generally relates to computerized systems and methods for intelligent extraction of quantities from product titles. In particular, embodiments of the present disclosure relate to inventive and unconventional systems relate to enabling systems to extract accurate information from product listings in order to enhance computerized understanding of products based on product titles.

BACKGROUND

Conventional online shopping platforms allow customers to shop for and purchase a wide range of items from e-commerce companies, third parties, or other online sellers. Currently, there are a large number of online shopping platforms available to customers, each platform being capable of facilitating the sale and/or shipment of up to several million different products. This large volume and variety of different products can present a multitude of technological and business problems for e-commerce companies and the like that must be capable of understanding competing products in order to make important business decisions. With a continuingly increasing amount of products and sale offers available through the Internet, it is practically impossible for humans to produce a comprehensive understanding of even a small portion of competing products on the online market.

Some conventional computer systems may be able to determine product similarity by comparing Universal Product Codes, International Article Numbers, or other product identifiers. However, these product identifiers are not widely used in many areas globally, rendering these computer systems useless or impractical in these areas. Furthermore, product identifiers may only provide enough information regarding the attributes of a given product, preventing a more comprehensive understanding of the associated products. Without these product identifiers, a human may be able to compare information in multiple online product listings (e.g., product titles) to determine the similarity of different products. Conventional computer systems, however, are limited in their ability to make the same similarity determinations as humans, because different product listings and titles may include different words, descriptors, and/or quantities that may cause computer systems to make an inaccurate determination that two products are different, even when a human could easily recognize that the difference are inconsequential and that the two products are the same.

Therefore, there is a need for improved computerized methods and systems for intelligently evaluating text contained in product listings in order to generate accurate and automatic identifications, understandings, and comparisons among the large amounts of products available for sale through the internet.

SUMMARY

One aspect of the present disclosure is directed to a computer-implemented system for extracting quantities from product titles. The system may include: a memory storing instructions; and at least one processor configured to execute the instructions to perform operations including: retrieving, from at least one data structure, a first product identifier comprising at least one tag; determining, based on the at least one tag, a number of quantity related tags; flagging the product identifier as having a first quantity if the number of quantity-related tags is zero; if the number of quantity-related tags is one: determining a second quantity based on a category of the product and a unit included in the quantity-related tag; and flagging the first product identifier as having the second quantity; if the number of quantity-related tags is greater than one: determining a third quantity based on a pattern of the quantity-related tags and the category of the product, and flagging the first product identifier as having the third quantity; comparing the at least one tag and quantity of the first product identifier with at least one tag and quantity associated with a second product identifier; generating, based on the comparison, at least one similarity value between the first product identifier and the second product identifier; and transmitting instructions to at least one user device, wherein the instructions cause the at least one user device to display the at least one similarity value.

Another aspect of the present disclosure is directed to a method for extracting attributes from product titles. The method may include: retrieving, from at least one data structure, a first product identifier comprising at least one tag; determining, based on the at least one tag, a number of quantity related tags; flagging the product identifier as having a first quantity if the number of quantity-related tags is zero; if the number of quantity-related tags is one: determining a second quantity based on a category of the product and a unit included in the quantity-related tag; and flagging the first product identifier as having the second quantity; if the number of quantity-related tags is greater than one: determining a third quantity based on a pattern of the quantity-related tags and the category of the product, and flagging the first product identifier as having the third quantity; comparing the at least one tag and quantity of the first product identifier with at least one tag and quantity associated with a second product identifier; generating, based on the comparison, at least one similarity value between the first product identifier and the second product identifier; and transmitting instructions to at least one user device, wherein the instructions cause the at least one user device to display the at least one similarity value.

Yet another aspect of the present disclosure is directed to a computer-implemented system for extracting quantities from product titles. The system may include: a memory storing instructions; and at least one processor configured to execute the instructions to perform operations including: retrieving, from at least one data structure, a first product identifier and a second product identifier, each product identifier comprising at least one tag; for each product identifier: determining, based on the at least one tag, a number of quantity related tags; flagging the product identifier as having a first quantity if the number of quantity-related tags is zero; if the number of quantity-related tags is one: determining a second quantity based on consulting a probability table; and flagging the first product identifier as having the second quantity; and if the number of quantity-related tags is greater than one: determining a relationship between the quantity-related tags based on a pattern of the quantity-related tags; determining the third quantity using a formula associated with the determined relationship; and flagging the first product identifier as having the third quantity; comparing the at least one tag and quantity of the first product identifier with the at least one tag and quantity associated with the second product identifier; generating, based on the comparison, at least one similarity value between the first product identifier and the second product identifier; and transmitting instructions to at least one user device, wherein the instructions cause the at least one user device to display the at least one similarity value.

Other systems, methods, and computer-readable media are also discussed herein.

DETAILED DESCRIPTION

Figure 1A:
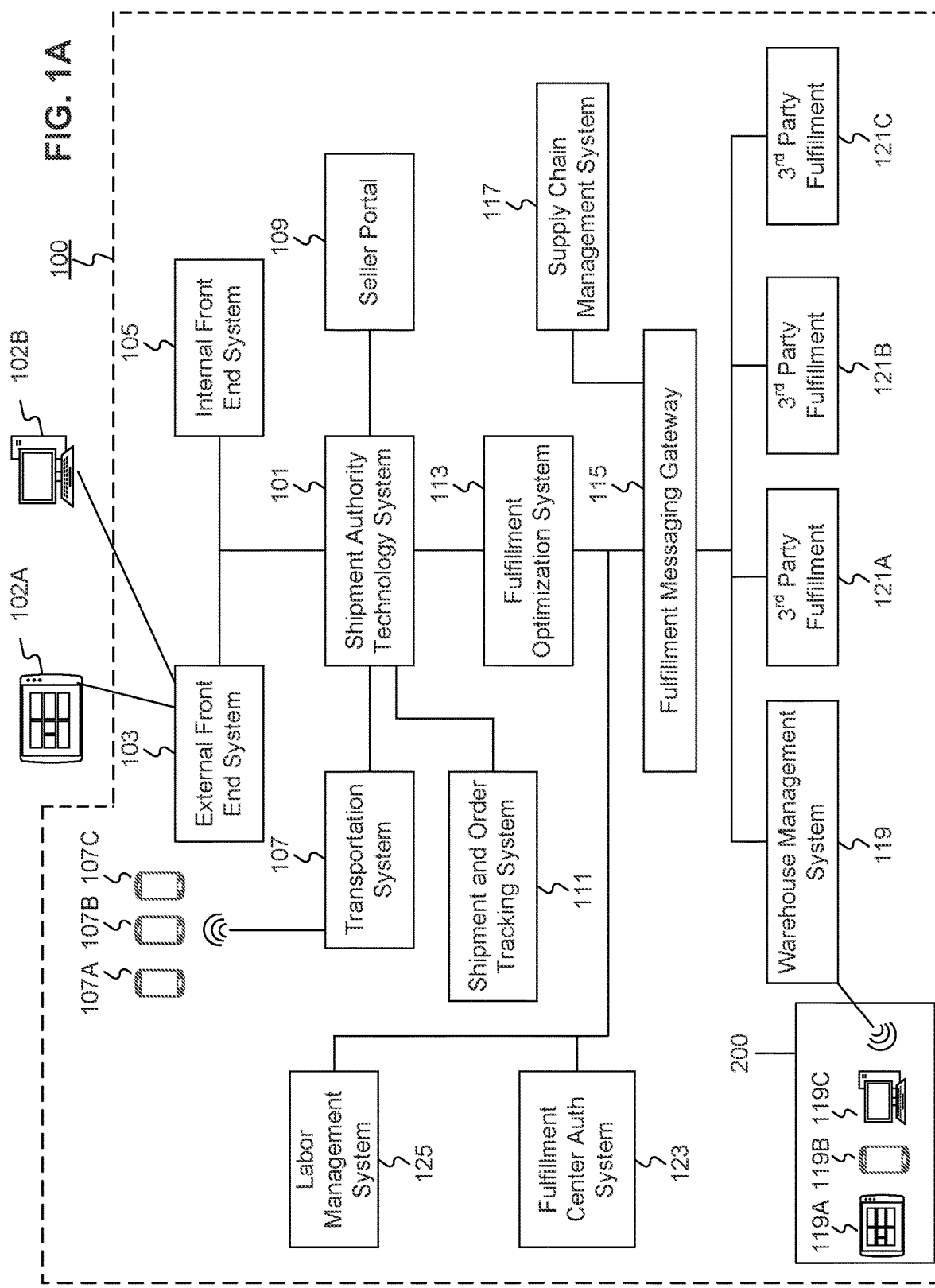
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Detail Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for intelligent extraction of quantities from product titles.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
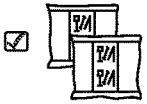
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11 a/b/g/n Standards, a leased line, or the like. In some embodiments, one or more of the systems in system 100 may be implemented as one or more virtual servers implemented at a data center, server farm, or the like.

Figure 2:
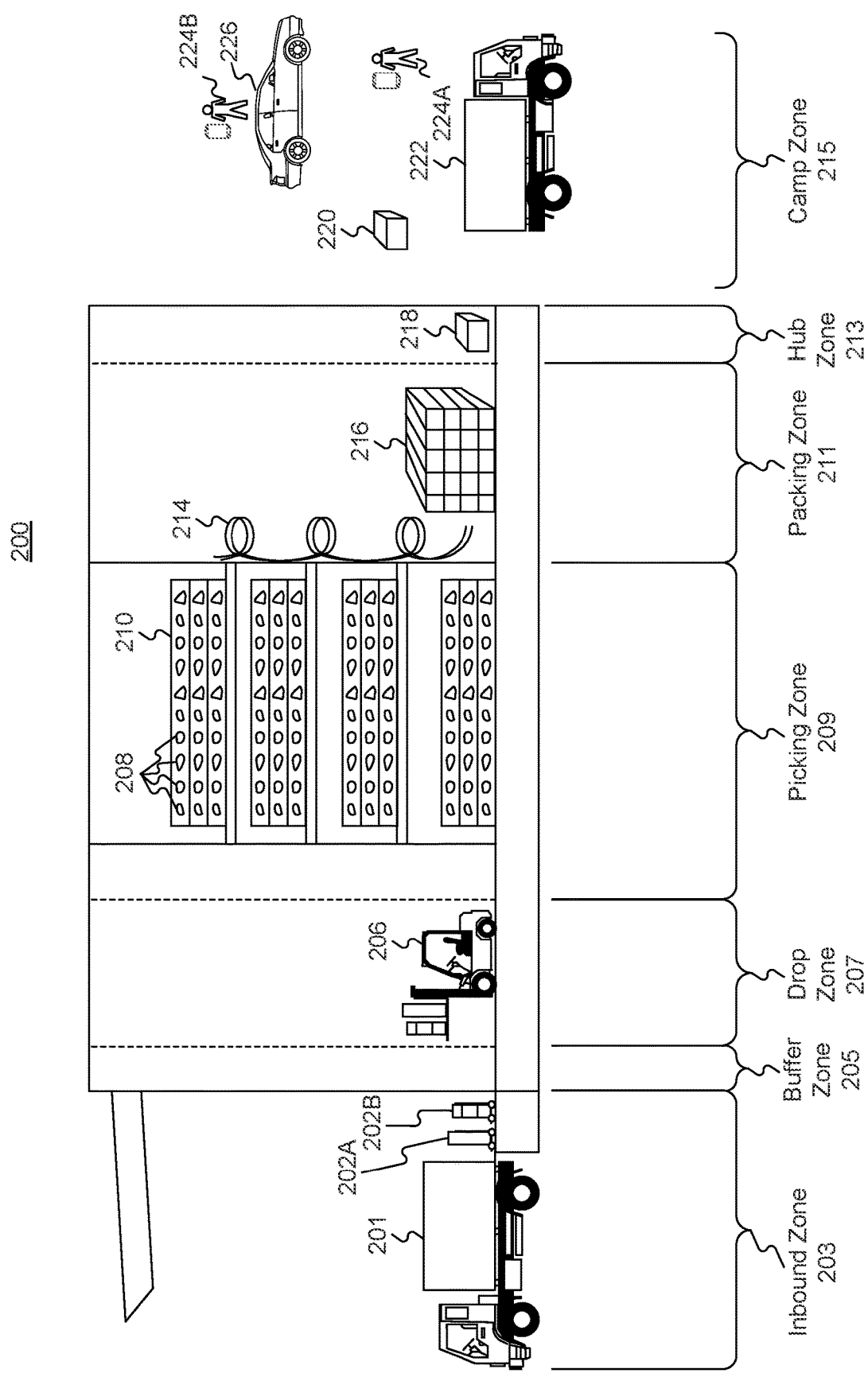
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
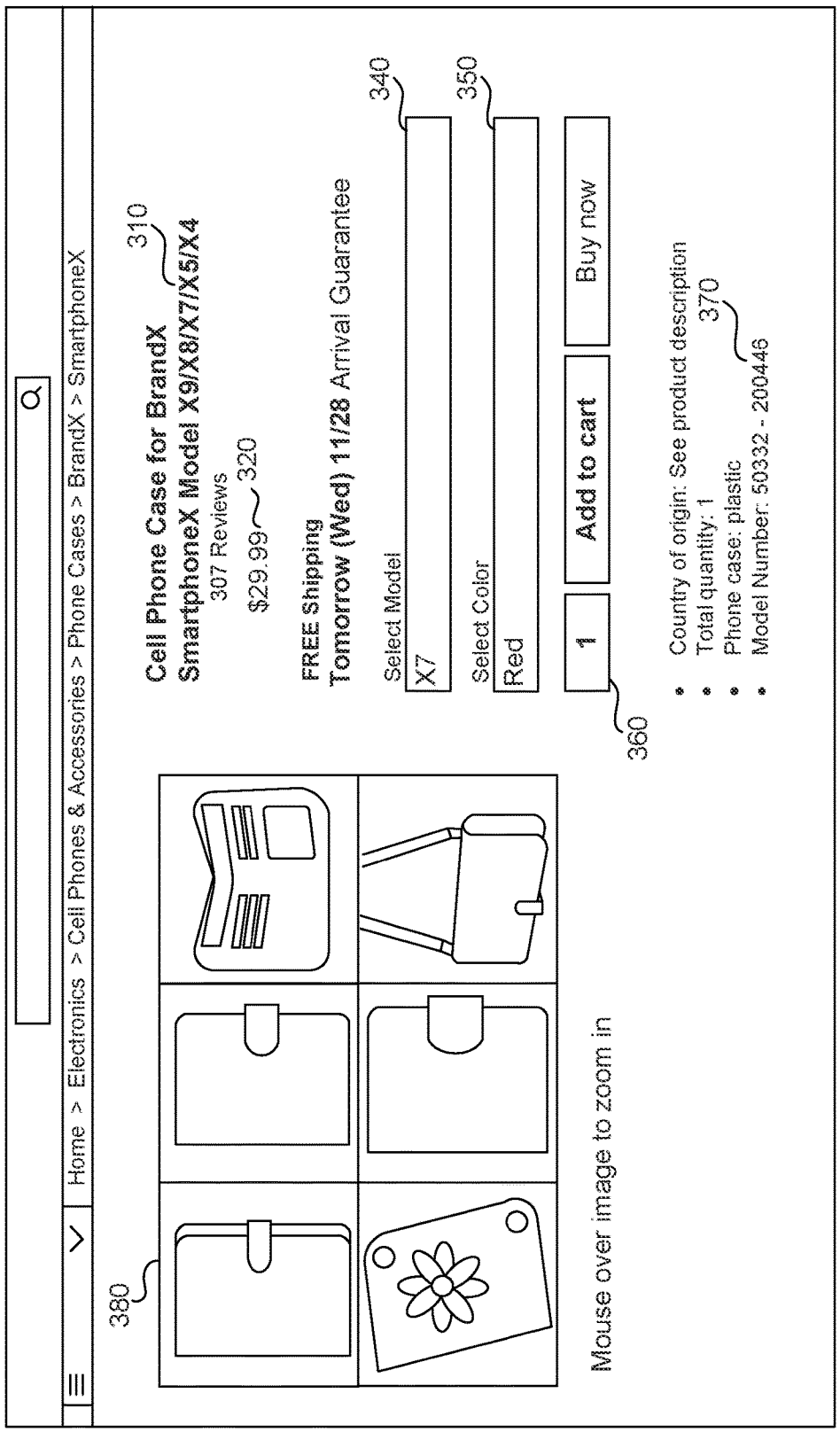
FIG. 3 depicts a sample product listing that includes a product and information about the product along with interactive user interface elements, consistent with the disclosed embodiments.

FIG. 3 depicts a sample product listing that includes a product and information about the product along with interactive user interface elements, consistent with the disclosed embodiments. The product listing may be generated and maintained on a web site, for example, that is hosted by external front end system 103. In some embodiments, the product listing may be listed or stored by systems or data structures external to system 100, such as websites, third party sellers, databases, or other sources accessible through one or more private or public networks (e.g., the Internet, an Intranet, a WAN, a MAN, etc.). The product listing may include several elements associated with one or more products, such as a title 310, a price 320, pictures 330, selectable options 340 and 350, quantity 360, model number 340, or any other information associated with one or more products in the product listing. Since a product listing may include one or more fields (e.g., selectable options 340 and 350) including a plurality of several selectable options (e.g., model, color, style, quantity, etc.), each product listing may include one product or a plurality of products, consistent with the disclosed embodiments. In FIG. 3, the sample product listing is illustrated as a web page, however, it is to be understood that the term "product listing" may refer to any collection of data or information associated with one or more related products, such as an entry in a database associated with system 100 or other external systems.

Figure 4:
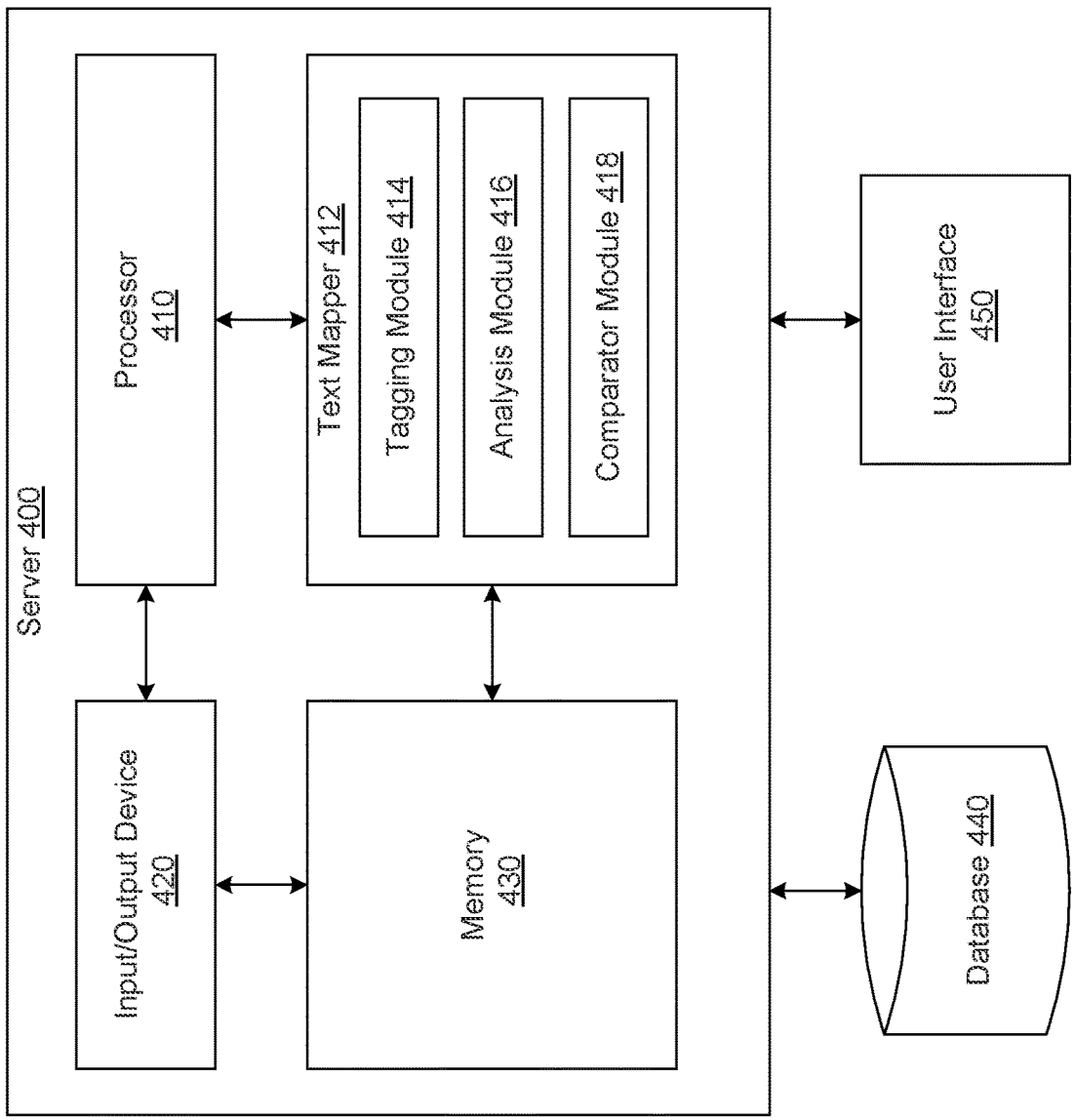
FIG. 4 is a block diagram of an example server computer system, consistent with the disclosed embodiments.

FIG. 4 is a block diagram of an example server computer system 400 (referred to as "server 400" hereinafter), consistent with some embodiments of this disclosure. Server 400 may be one or more computing devices configured to execute software instructions stored in memory to perform one or more processes consistent with some embodiments of this disclosure. For example, server 400 may include one or more memory devices for storing data and software instructions and one or more hardware processors to analyze the data and execute the software instructions to perform server-based functions and operations (e.g., back-end processes). The server-based functions and operations may include, for example, intelligently evaluating text contained in product listings in order to generate accurate and automatic identifications, understandings, and comparisons of a plurality of products.

In FIG. 4, server 400 includes a hardware processor 410, an input/output (I/O) device 420, and a memory 430. It should be noted that server 400 may include any number of those components and may further include any number of any other components. Server 400 may be standalone, or it may be part of a subsystem (e.g., external front end system 103, internal front end system 105, etc.) which may be part of a larger system (e.g., system 100). For example, server 400 may represent distributed servers that are remotely located from one another and communicate over a network.

Processor 410 may include or one or more known processing devices, such as, for example, a microprocessor. In some embodiments, processor 410 may include any type of single or multi-core processor, mobile device microcontroller, central processing unit, or any circuitry that performs logic operations. In operation, processor 410 may execute computer instructions (e.g., program codes) and may perform functions in accordance with techniques described herein. Computer instructions may include routines, programs, objects, components, data structures, procedures, modules, and functions, which may perform particular processes described herein. In some embodiments, such instructions may be stored in memory 430, processor 410, or elsewhere.

I/O device 420 may be one or more devices configured to allow data to be received and/or transmitted by server 400. I/O device 420 may include one or more customer I/O devices and/or components, such as those associated with a keyboard, mouse, touchscreen, display, or any device for inputting or outputting data. I/O device 420 may also include one or more digital and/or analog communication devices that allow server 400 to communicate with other machines and devices, such as other components of server 400. I/O device 420 may also include interface hardware configured to receive input information and/or display or otherwise provide output information. For example, I/O device 420 may include a monitor configured to display a customer interface.

Memory 430 may include one or more storage devices configured to store instructions used by processor 410 to perform functions related to disclosed embodiments. For example, memory 430 may be configured with one or more software instructions associated with programs and/or data.

Memory 430 may include a single program that performs the functions of the server 400, or multiple programs. Additionally, processor 410 may execute one or more programs located remotely from server 400. Memory 430 may also store data that may reflect any type of information in any format that the system may use to perform operations consistent with disclosed embodiments. Memory 430 may be a volatile or non-volatile (e.g., ROM, RAM, PROM, EPROM, EEPROM, flash memory, etc.), magnetic, semiconductor, tape, optical, removable, non-removable, or another type of storage device or tangible (i.e., non-transitory) computer-readable medium.

Consistent with some embodiments of this disclosure, server 400 may include text mapper 412 that may include tagging module 414, analysis module 416, and comparator module 418. Text mapper 412 may be configured to autonomously and automatically implement text-based analyses (e.g., quantity analysis, product comparisons, product type mapping, etc.) of one or more product listings using include tagging module 414, analysis module 416, and comparator module 418. Text mapper 412 may be implemented as software (e.g., program codes stored in memory 430), hardware (e.g., a specialized chip incorporated in or in communication with processor 410), or a combination of both. Tagging module 414, analysis module 416, and comparator module 418 will be discussed in further detail below with reference to FIG. 5.

Server 400 may also be communicatively connected to one or more databases 440. For example, server 400 may be communicatively connected to database 440. Database 440 may be a database implemented in a computer system (e.g., a database server computer). Database 440 may include one or more memory devices that store information (e.g., the data outputted by text mapper 412) and are accessed and/or managed through server 400. By way of example, database 440 may include Oracle™ databases, Sybase™ databases, or other relational databases or non-relational databases, such as Hadoop sequence files, HBase, or Cassandra. Systems and methods of disclosed embodiments, however, are not limited to separate databases. In one aspect, server 400 may include database 440. Alternatively, database 440 may be located remotely from the server 400. Database 440 may include computing components (e.g., database management system, database server, etc.) configured to receive and process requests for data stored in memory devices of database 440 and to provide data from database 440.

Server 400 may also be communicatively connected to at least one user interface 450. User interface 450 may include a graphical interface (e.g., a display panel), an audio interface (e.g., a speaker), or a haptic interface (e.g., a vibration motor). For example, the display panel may include a liquid crystal display (LCD), a light-emitting diode (LED), a plasma display, a projection, or any other type of display. The audio interface may include microphones, speakers, and/or audio input/outputs (e.g., headphone jacks). In some embodiments, user interface 450 may be included in server 400. In some embodiments, user interface 450 may be included in a separate computer system. User interface 450 may be configured to display data transmitted from server 400.

In connection with server 400 as shown and described in FIG. 4, the systems and methods as described herein may provide a technical solution to technical problems in text mapping. Aspects of this disclosure may relate to intelligently evaluating text contained in product listings in order to generate accurate and automatic identifications, understandings, and comparisons among the large amounts of products available for sale through the internet. For ease of description, a system is described below, with the understanding that aspects to the system apply equally to methods, apparatuses, and non-transitory computer-readable media. For example, some aspects of such a system can be implemented by a system (e.g., server 400 and database 440), by an apparatus (e.g., server 400), as a method, or as program codes or computer instructions stored in a non-transitory computer-readable medium (e.g., memory 430 or another storage device of server 400). In a broadest sense, the system is not limited to any particular physical or electronic instrumentalities, but rather can be accomplished using many different instrumentalities.

Consistent with some embodiments of this disclosure, a system for intelligent extraction of quantities from product titles may include a non-transitory computer-readable medium configured to store instructions and at least one processor configured to execute the instructions to perform operations. A computer application, as used herein, may refer to a set of computer programs or modules combined in a logical manner to implement a function (e.g., text mapping). In some embodiments, the computer application may be created, maintained, updated, or executed at a server computer of the system. In some cases, because the function may be implemented by multiple, different sequences of operations the computer application may be implemented by multiple, different programs.

By way of example, with reference to FIG. 4, the system may include server 400 and database 440. The at least one processor may be processor 410 in server 400. The non-transitory computer-readable medium may be memory 430 in server 400. The instructions stored in the non-transitory computer-readable medium may be used for implementing text mapper 412 in server 400.

Figure 5:
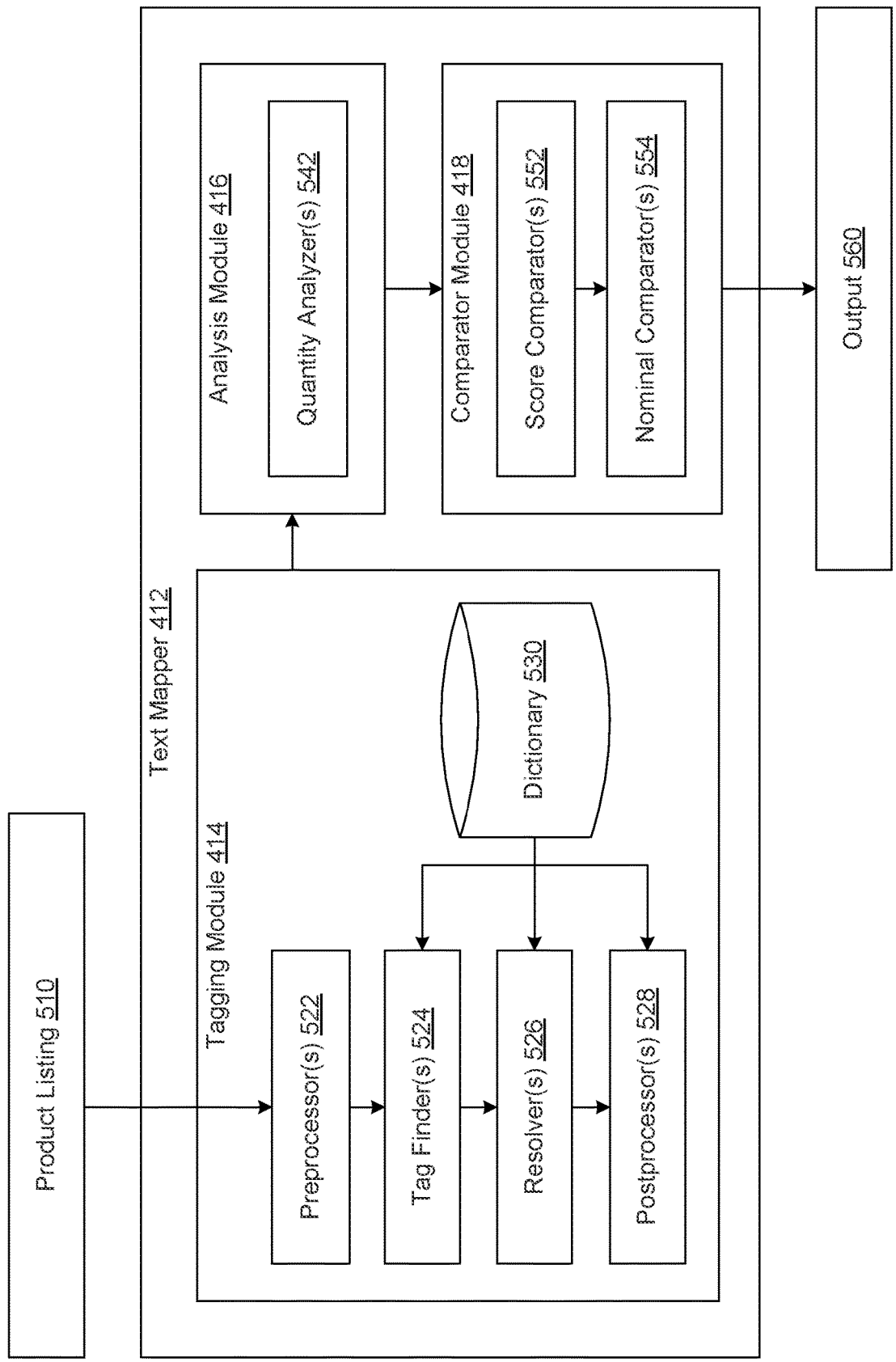
FIG. 5 is a diagram of an example structure of a text mapper for intelligent product listing analysis, consistent with the disclosed embodiments.

FIG. 5 is a diagram of an example structure of text mapper 412 for intelligent product listing analysis, consistent with some embodiments of the present disclosure. Text mapper 412 may be configured to perform a variety of operations related to natural language processing ("NLP") of text. By way of example, text mapper 412 may be configured to receive and/or retrieve one or more product listings (e.g., FIG. 3) from database 440, perform one or more analyses on the one or more product listings, and output a result of the analyses (e.g., a determined product type or comparison score).

In some embodiments, text mapper 412 may include tagging module 414. Tagging module 414 may be configured to receive one or more product listings 510. The process of "tagging" may refer to identifying, extracting, and/or evaluating, in the product listing, all candidate words (i.e., "tags") that may be attributes, quantities, or other descriptors related to the product. For example, tagging module 414 may process the product listings 510 to identify, extract, and/or evaluate attributes, quantities, or other product related information from the product listing. In some embodiments, text mapper 412 may include preprocessor(s) 522, tag finder(s) 524, resolver(s) 526, and postprocessor(s) 528, each of which may be configured to execute one or more processes relating to tagging one or more product listings.

In some embodiments, preprocessor(s) 522 may be configured to perform a variety of text preprocessing functions, such as tokenization, normalization, and noise removal. Such functions may include, but are not limited to, removal of HTML tags, removal of extra whitespace, removal of special characters, removal of numbers, removal of stop words, conversion of accented characters to ASCII characters, expansion of contractions, conversion of letters to lowercase, conversion of number words to numeric form, lemmatization, etc. For example, preprocessor(s) 522 may be configured to filter, convert, or otherwise preprocess the information contained in the product listing description into identifiable individual properties, characters, or attributes. In some embodiments, preprocessor(s) 522 may be configured to filter the information in product listing 510 and identify special characters (e.g., hashtags, punctuation, numbers, etc.) as well as option numbers, and may remove them and/or convert them to normal characters. By way of example, a product title included in product listing 510 may include the text "/◊001#X7#color:red/" and convert the text to a standard form, such as "01; X7; red", In some embodiments, tag finder(s) 524 may be configured to identify, extract, and/or evaluate, in the product listing, candidate words (i.e., "tags") in the preprocessed text. For example, if product listing 510 includes a model number for a product, tag finder(s) 524 may find the specific text and tag it as the model number. Tag finder(s) 524 may include pattern-based tag finders that extract tags by recognizing regular expressions. In some embodiments, tag finder(s) 524 may consult dictionary 530 and extract tags from words in the preprocessed text that have be previously registered with tags. Dictionary 530 may be stored in a memory, such as a database (e.g., database 440) and may be accessed and/or modified by one or more systems, subsystems, or components associated with system 100 (e.g., server 400). In some embodiments, tag finder(s) 524 may include tag finders that may be configured to extract tags that cannot be extracted from a syntactic word (e.g., from a combination of numbers, letters, and/or symbols). In some embodiments, a tag finder may refer to a program or module associated with tag finder(s) 524 that may be configured to perform various forms of morphological analysis. For example, a tag finder may be configured to access at least one data structure (e.g., dictionary 530) and extract the results of a morphological analysis of product titles in the form of tags. In some embodiments, a tag finder may also be configured to determine linguistically meaningful tag and prevent excessive segmentation of words (e.g., by extracting compound words as tags).

In some embodiments, tag finder(s) 524 may be configured to extract one or more tags from a single word. For example, a product title associated product listing 510 may include the word "red" that refers to a brand instead of a color. Tag finder(s) 524 may extract two tags from the term, one being associated with the color and one being associated with a brand. In another example, a product title may include the word "magicpants". Tag finder(s) 524 may extract two tags from the term, one being associated with the "magicpants/brand" (i.e., a sub-brand of Huggies) and one being associated with "magic/product" and "pants/product". In some embodiments, tag finder(s) 524 may convert the origin text of an extracted tag to a representative word, for example when product listing 510 includes a homonym, typo, or an abbreviation.

In some embodiments, resolver(s) 526 may be configured to determine the most appropriate combination of attributes from all of the tags extracted by tag finder(s) 524. Resolver(s) 526 may operate in series or in tandem with tag finder(s) 524. For example, tag finder(s) 524 may use the most appropriate combination of attributes determined by resolver(s) 526 in order to determine the most appropriate tag to associate with one or more words or characters included in product listing 510. Resolver(s) 526 may consult one or more knowledge bases (e.g., dictionary 530, knowledge graphs, probabilistic tables, etc.) and/or one or more algorithms (e.g., Viterbi algorithms, Naïve Bayes algorithms, etc.) in order to determine the optimal combination of attributes.

In some embodiments, postprocessor(s) 528 may be configured to perform postprocessing operations on the extracted attributes based on information contained in the product listing, such as option fields. Such operations may include, but are not limited to, determining and extracting one or more sale objects individually from the product listing. For example, in FIG. 3, title 310 of the product listing mentions several models (i.e., X9/X8/X7/X5/X4), each of which may be tagged as individual attributes. The actual sale object of this product listing, however, would only correspond to a single one of these models depending on the customer's selection in the "Select Model" field 340 and the "Select Color" field 350. Based on these models being listed in both the title of the product listing and an option field, postprocessor(s) 528 may determine that the title refers to multiple products and identify each individual product. For example, postprocessor(s) 528 may detect option fields in product listing 510 and extract each option within each option field. In some embodiments, postprocessor(s) 528 may employ one or more matching methods (e.g., string-matching algorithms, naïve string searches, finite-state-automation-based searches, stubs, index methods, etc.) to determine that the options correspond to text in the title.

In some embodiments, text mapper 412 may include analysis module 416. Analysis module 416 may be configured to perform analyses of information in the product listing other than product attributes that are necessary for systems to comprehensively understand the product. For example, in some embodiments, analysis module 416 may include quantity analyzer(s) 542. Quantity analyzer(s) 542 may be configured to analyze quantity information included in the product listing. By way of example, quantity analyzer(s) 542 may evaluate one or more extracted tags that are associated with values to determine if the sale object includes multiple units. Quantity analyzer(s) 542 may interpret the quantity of the product by using, for example. a category of the product, the pattern of the quantity tags, and/or the relationships between the quantity tags and non-quantity tags (e.g., by using a probability table).

In some embodiments, text mapper 412 may include comparator module 418. Comparator module 418 may be configured to use the information processed by tagging module 414 and analysis module 416 to determine similarities between two or more products contained in one or more product listings. In some embodiments, comparator module 418 may include score comparator(s) 552 and nominal comparator(s) 554. Score comparator(s) 552 may generate a numeric similarity score between the products (e.g., text similarity, brand similarity, model number similarity, attribute similarity, keyword similarity, etc.) whereas nominal comparator(s) 554 may generate results based on nominal features of each product. Score comparator(s) 552 and nominal comparator(s) 554 may employ one or more methods or algorithms for determining similarity (e.g. string similarity algorithms, edit distance based algorithms, token-based algorithms, sequence-based algorithms, etc.) The results generated by score comparator(s) 552 and nominal comparator(s) 554 may be included in output 560 that is output by comparator module 418. Output 560, in some embodiments, may include instructions that text mapper 412 may transmit that causes at least one computerized system to execute one or more operations relating to the results. For example, the instructions may cause at least one user device to display the results (e.g., via user interface 450) or cause the results to be registered and/or inserted in at least one data structure (e.g., database 440).

Figure 6:
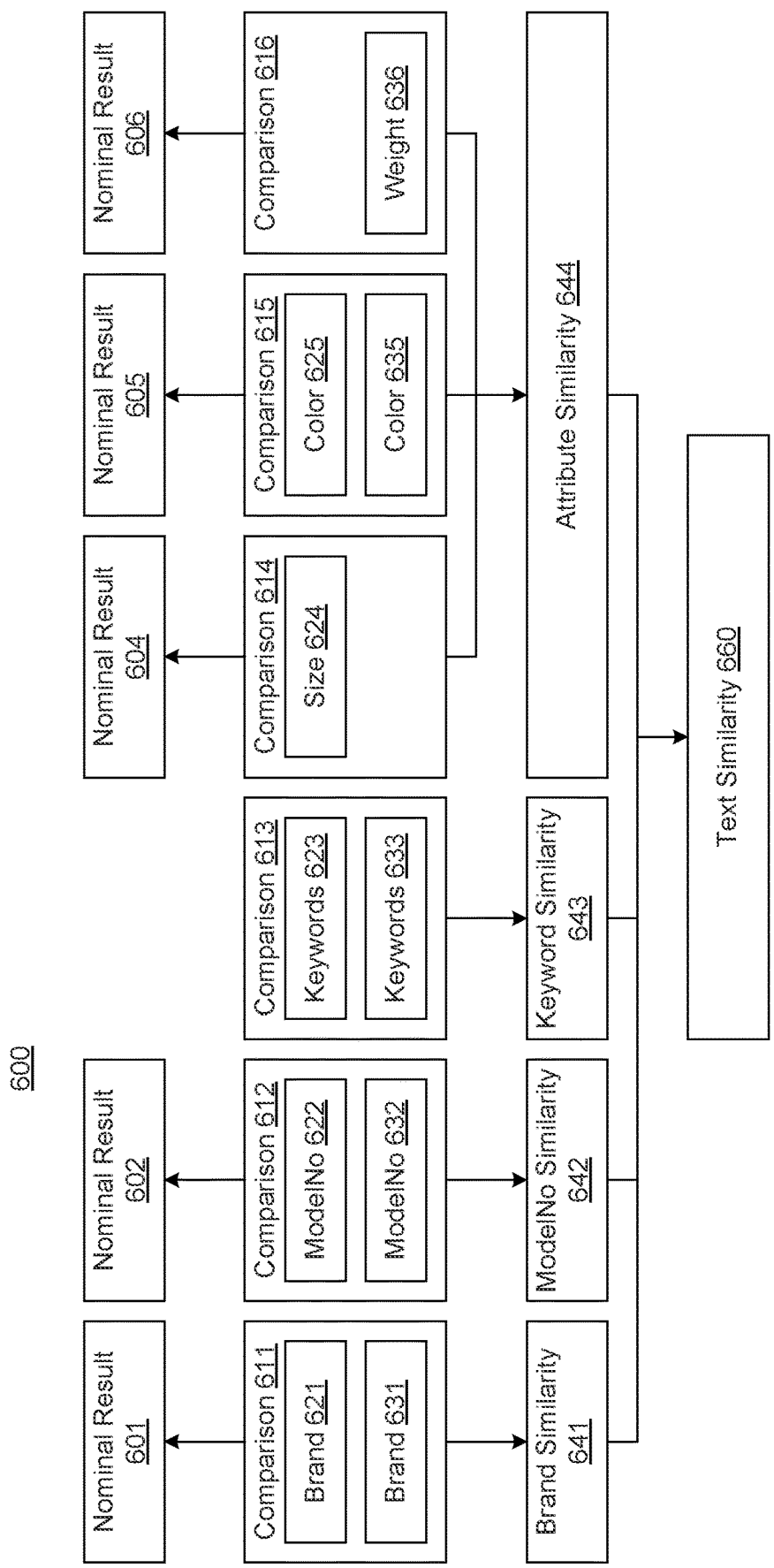
FIG. 6 is a block diagram illustrating comparison results that may be generated by disclosed systems and methods, consistent with the disclosed embodiments.

FIG. 6 is a block diagram illustrating comparison results 600 that may be generated by disclosed systems and methods, consistent with the present disclosure. Results 600 may be generated, for example, by comparator module 418 of text mapper 412, and may be included as part of output 560. Each comparison in FIG. 4 (e.g., brand comparison 611, ModelNo comparison 612, keywords comparison 613, size comparison 614, color comparison 615, and weight comparison 616) is associated with a particular attribute of the compared products. It is to be understood, however, that results 600 may include any number or type of comparisons relating to any number of attributes and/or products. Each comparison includes a comparison between extracted attributes associated with a first product (i.e., brand 621, ModelNo 622, keywords 623, size 624, and color 625) against corresponding extracted attributes associated with a second product (i.e., brand 631, ModelNo 632, keywords 633, color 635, and weight 636).

In some embodiments, results 600 may include a set of numeric results between the two products (i.e., brand similarity 641, ModelNo similarity 642, keyword similarity 643, and attribute similarity 644) that may be a percentage or other score-based result. In some embodiments, the numeric results may be combined into a single text similarity 660. Results 600 may also include a set of nominal results. By way of example, nominal brand result 601 may indicate a "match" between brand 621 and brand 631 (i.e., they are the same brand), nominal ModelNo result 602 may indicate a "partial match", nominal result 604 may indicate that a size attribute did not appear for the second product, nominal result 605 may indicate that color 625 and 635 do not match, and nominal result 606 may indicate that a weight attribute did not appear for the first product. In some embodiments, results 600 may be generated using one or more methods or algorithms for determining similarity (e.g. string similarity algorithms, edit distance based algorithms, token-based algorithms, sequence-based algorithms, etc.).

In some embodiments, results 600 may include one or more numeric results based on comparing a price per unit for two or more products. The price per unit may, for example, be determined by one or more components of text mapper 412 (e.g., analysis module 416). In some embodiments, the price per unit may be based on quantities of the product that may be determined by one or more components of text mapper 412 (e.g., quantity analyzer(s) 542). By way of example, two separate product listings may include similar product types (e.g., diapers), but have different quantities of the specific product. A first product listing may be for "newborn diapers (12 packs of 20)" that costs a total of $24 and a second product listing may be for "newborn diapers (6 packs of 20)" that costs a total $18 dollars. In some embodiments, text mapper 412 may be configured to compare the determined price per unit of the first product listing (i.e., $0.10 per diaper) with the determined price per unit of the second product listing (i.e., $0.15 per diaper) instead of comparing the actual prices contained in each product listing (i.e., $24 and $18).

Figure 7:
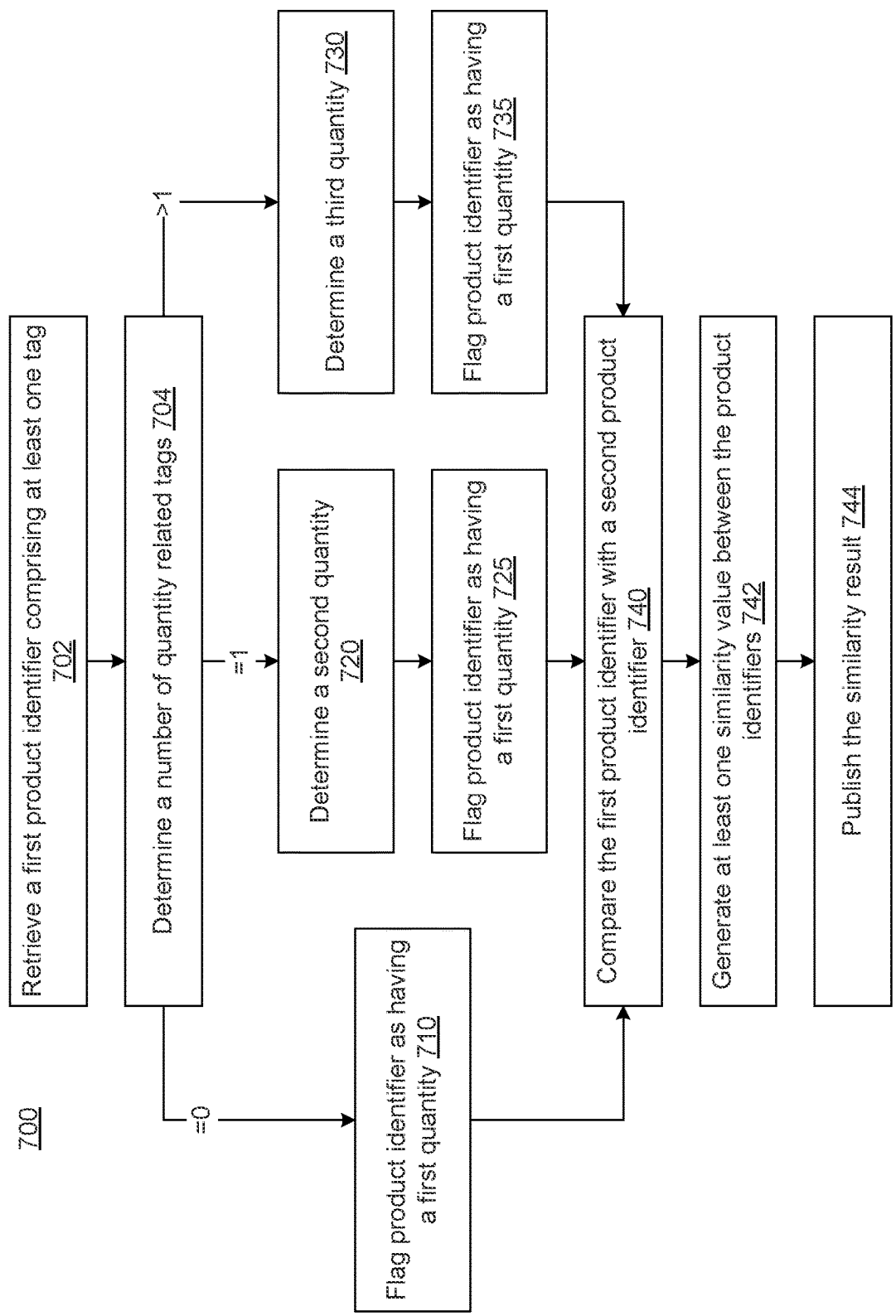
FIG. 7 is a flow diagram of an exemplary process for extracting quantities from product titles, consistent with the disclosed embodiments.

FIG. 7 is a flow diagram of exemplary process 700 for extracting quantities from product titles, consistent with embodiments of this disclosure. In some embodiments, process 700 may be executed by one or more processors (e.g., processor 410 in server 400 in FIG. 4) associated with system 100, and/or executed either partially or wholly by the one or more components or sub-components of system 100 (e.g., external front end system 103, internal front end system, server 400, text mapper 412, etc.) For ease of discussion, process 700 will be as described as being executed by text mapper 412 and sub-components thereof (e.g., analysis module 416, quantity analyzer(s) 542, etc.), although it is to be understood that process 700 may be executed by any suitable component or sub-component of the present disclosure.

Process 700, in some embodiments, may begin at step 702. At step 702, text mapper 412 may retrieve, from at least one data structure (stored in, e.g., database 440), one or more product identifiers. In some embodiments, the one or more product identifiers may be associated with a combination of one or more tags. For example, in some embodiments, each product identifier may be associated with a set of predetermined tags. In some embodiments, however, text mapper 412 may determine tags associated with the product identifier as part of process 700 (e.g., at step 704). The at least one tag may be associated with at least one attribute such as a brand, a product name, a specification, a keyword, a price, and/or a model number. In some embodiments, the one or more product identifiers may generated through a text mapping process based on a title of a product or a product listing. By way of example, text mapper 412 may retrieve one or more product listings 510 and generate one or more product identifiers containing a combination of tags or attributes using tagging module 414, and analysis module 416 may retrieve the product identifier from tagging module 414.

At step 704, text mapper 412 may determine a number of quantity related tags based on the at least one tag contained in the one or more retrieved product identifiers. For example, a product identifier associated with a product listing for "newborn diapers (12 packs of 20)" may contain tags such as "12/quantity" and/or "20/quantity." In this example, text mapper 412 may determine that the product identifier contains two quantity related tags, however, other product identifiers may contain no quantity related tags or any other number of quantity related tags. In some embodiments, text mapper 412 may consult a dictionary (e.g. dictionary 530 in tagging module 414 or a dictionary stored in database 440 in FIG. 4) when determining the number of quantity related tags. For example, a dictionary may include, for example, descriptions, related attributes, and related tags for any number of characters and/or words. In some embodiments, a dictionary associated with text mapper 412 may be configured to apply differently based on a determined category of product and/or there may be separate dictionaries for different types of products. For example. In most categories, text mapper 412 may interpret the keyword "piece" as a unit. However, text mapper may interpret "piece" differently for other categories (e.g., jigsaw puzzles). In some embodiments, characters and/or words included in the dictionary may be in any form of spoken, written, and/or computer-readable language. For example, text mapper 412 may be configured to consult a dictionary to analyze a listing for "laptop with a 15.6 inch display" to determine that the number "15.6" is followed by "inch", which may be tagged as a unit. Accordingly, text mapper 412 may determine that the tag including "15.6" should not be included in the number of quantity related tags.

Once text mapper 412 has determined the number of quantity related tags, it may proceed to perform an analysis of the quantity related tags to determine a specific quantity associated with the product identifier (e.g., at steps 710, 720, 725, 730, 735). In some embodiments, the analysis of the quantity related tags may include, or may be followed by, flagging the product identifier as having the specific determined quantity. Flagging a product identifier may include, for example, modifying a parameter associated with the product identifier in at least one database (e.g., database 440). For example, one or more databases associated with system 100 may maintain a listing or a record of product identifiers and associated information, and text mapper 412 may be configured to modify the product identifiers and related information in the one or more databases. In some embodiments, flagging the product identifier may include determining a price per unit associated with the first product identifier and flagging the first product identifier as having the price per unit. For example, a product listing for "newborn diapers (12 packs of 20)" may have a price of $24 dollars. However, text mapper 412 may determine that the product listing is associated with 240 (12×20) diapers, and may determine that the product listing has a price per unit of $0.10 per diaper by dividing the price for the product listing by the total determined quantity of diapers.

If, at step 704, text mapper 412 determines that there are no quantity related tags contained in a product identifier, process 700 may proceed to step 710. At step 710, text mapper 412 may flag the product identifier as having a first quantity (e.g., 1). For example, text mapper 412 may determine that none of the tags contained in a product identifier generated based off the product listing in FIG. 3 (e.g., "cellphone/device; case/accessory; brandx/devicebrand; smartphonex/devicename; x9/devicemodel") are quantity related. Based on at least this determination, text mapper 412 may infer that the product identifier is associated with a single cell phone case and may flag the identifier as having a quantity of one.

If, at step 704, text mapper 412 determines that there is one quantity related tag contained in a product identifier, process 700 may proceed to step 720. At step 720, text mapper 412 may determine a second quantity based on one or more of a category of the product and a unit included in the quantity related tag. For example, text mapper 412 may determine that a product identifier associated with a product listing of "forks, 4" is associated with a quantity of four forks and may flag the product identifier as having a quantity of four.

In some embodiments, however, text mapper 412 may determine that the quantity related tag is not associated with an actual quantity of a sale item but is instead a descriptor of the sale item itself. For example, in some embodiments, text mapper 412 may consult a dictionary (e.g. dictionary 530 in tagging module 414 or a dictionary stored in database 440 in FIG. 4) to determine that a quantity related tag is not associated with an actual quantity of a sale item. For example, a dictionary may include, for example, descriptions, related attributes, and related tags for any number of characters and/or words. The characters and/or words may be in any form of spoken, written, and/or computer-readable language. For example, text mapper 412 may be configured to consult a dictionary to analyze a listing for "laptop with a 15.6 inch display" to determine that the listing includes a quantity related tag (i.e., "15.6/quantity") followed by a unit tag (i.e., "inch/unit"). Accordingly, text mapper 412 may interpret the listing for "laptop with a 15.6 inch display" to be associated with a quantity of one. At step 725, text mapper 412 may flag the product identifier as having the second quantity determined at step 720.

By way of example, text mapper 412 may determine that a product identifier associated with a product listing of "knife, fork, spoon, 3 set" is associated with a quantity of one set of silverware by determining that a tag of "3/quantity" refers to a number different items contained in a single sale item (i.e., one silverware set). Text mapper 412 may be configured to make this determination based at least on consulting at least one probability table that associates certain categories and/or attribute related tags contained in product identifiers with quantity related tags. In some embodiments, this determination may be made based on a category of the product. For example, the at least one probability table may indicate that a product identifier containing a number of item related tags (e.g. "knife/item; fork/item; spoon/item") equal to a number in a quantity related tag (e.g., "3/quantity"), or if the product identifier contains certain descriptor tags associated with the quantity related tags (e.g. "set/quantitydescriptor"), then that quantity related tag is likely to be a descriptor of the sale product rather than a quantity of the sale product.

If, at step 704, text mapper 412 determines that there is more than one quantity related tag contained in a product identifier, process 700 may proceed to step 730. At step 730, text mapper 412 may determine a third quantity based on one or more patterns of the quantity-related tags and the category of the product. In some embodiments, text mapper 412 may be configured to determine a relationship between the quantity-related tags based on the pattern and to further determine the third quantity using a formula associated with the determined relationship. For example, text mapper 412 may determine that two quantity related tags contained in a product identifier associated with a product listing for "newborn diapers (12 packs of 20)" (e.g., "12/quantity" and "20/quantity") have a relationship that would require the two quantities to be multiplied to determine the total quantity. Then, text mapper 412 may multiply the two quantities in the quantity related tags to determine that the product identifier is associated with a quantity of 240 diapers. This relationship may be determined, for example, based on an order of the tags and/or on other quantity descriptor tags contained in the product identifier (e.g., "packs/quantitydescriptor").

In some embodiments, text mapper 412 may also determine other mathematical relationships between two or more quantity related tags or if the two or more quantity related tags refer to the same thing. By way of example, text mapper 412 may determine that two quantity related tags contained in a product identifier associated with a product listing for "12 newborn diapers+4 extra" (e.g., "12/quantity" and "4/quantity") have a relationship that would require the two quantities to be added, or that three quantity related tags contained in a product identifier associated with a product listing for "12 newborn diapers (1 pack of 12)" (e.g., "12/quantity", "1/quantity", and "12/quantity") have a relationship that indicates redundant quantity tags and that the product listing only refers to twelve diapers. In some embodiments, text mapper 412 may be configured to determine any number of mathematical relationships of any type between any number of quantity related tags contained in a product identifier. At step 735, text mapper 412 may flag the product identifier as having the third quantity determined at step 730.

Once text mapper 412 has tagged the product identifier as having a quantity (i.e., at steps 710, 725, or 735), process 700 may proceed to step 740. At step 740, text mapper 412 may compare the at least one tag and quantity of the product identifier with at least one tag and quantity associated with one or more second product identifiers. At step 742, text mapper 412 may generate at least one similarity value between the two or more product identifiers based on the comparison completed at step 740. In some embodiments, steps 740 and 742 may be executed by comparator module 418, and the at least one similarity value may include one or more results 600 as depicted in FIG. 6. By way of example, the at least one similarity value may include a set of numerical similarity value between the two products (i.e., brand similarity 641, ModelNo similarity 642, keyword similarity 643, and attribute similarity 644). Text mapper 412 may also generate a set of nominal or categorical similarity values. By way of example, nominal brand result may indicate a "match" between one or more attributes and/or tags in the product identifiers (i.e., they are the same brand or have the same or similar price).

In some embodiments, the comparison may be based on a price per unit that is determined by text mapper 412 based on the flagged quantities of the product identifiers (e.g., at steps 710, 725, or 735). By way of example, two separate product listings may include similar product types (e.g., diapers), but have different quantities of the specific product. A first product listing may be for "newborn diapers (12 packs of 20)" that costs a total of $24 and a second product listing may be for "newborn diapers (6 packs of 20)" that costs a total $18 dollars. At step 740, in some embodiments, text mapper 412 may be configured to compare the determined price per unit of the first product listing (i.e., $0.10 per diaper) with the determined price per unit of the second product listing (i.e., $0.15 per diaper) instead of comparing the actual prices contained in each product listing (i.e., $24 and $18).

Once the at least one similarity value between the two or more product identifiers is generated at step 742, process 700 may conclude at step 744. At step 744, text mapper 412 may publish the at least one similarity value to one or more devices or systems. For example, in some embodiments, the similarity values generated by process 700 may be registered and/or inserted into at least one data structure (e.g., database 440) and/or published on one or more webpages. In some embodiments, publishing the at least one similarity value may include transmitting instructions to at least one user device that cause the user device to display the at least one similarity value (e.g., through user interface 450). In some embodiments, text mapper 412 may be configured to modify one or more parameters (e.g., a listed price and/or quantity) in at least one database (e.g., database 440) associated with a product listing based on the at least one similarity value generated at step 742 if the product listing is maintained in a data structure (e.g., database 440) associated with system 100.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for extracting quantities from product titles, the system comprising:
a memory storing instructions; and
at least one processor configured to execute the instructions to perform operations comprising:
retrieving, from at least one product listing maintained on a website, text including a product title;
preprocessing the text including the product title into identifiable attributes, wherein the preprocessing comprises at least one of tokenizing the product title or removing noise from the product title;
retrieving, a first product identifier comprising at least one tag extracted from the preprocessed text;
generating, using the at least one tag and a machine-learning algorithm that relies on historical product title data and determines an optimal combination of attributes, a combination of the identifiable attributes;
determining, a number of quantity related tags associated with the at least one tag;
flagging the product identifier as having a first quantity if the number of quantity-related tags is zero, wherein the flagging comprises modifying a quantity parameter associated with the product identifier in at least one data structure;
if the number of quantity-related tags is one:
consulting a probability table to determine a second quantity based on a unit associated with the quantity-related tag; and
flagging the first product identifier as having the second quantity, wherein the flagging comprises modifying a quantity parameter associated with the product identifier in at least one data structure;
if the number of quantity-related tags is greater than one:
determining a third quantity based on a pattern associated with the quantity-related tags, and
flagging the first product identifier as having the third quantity, wherein the flagging comprises modifying a quantity parameter associated with the product identifier in at least one data structure;
generating, based on the at least one tag, the combination of the identifiable attributes, and the flagged quantity, at least one similarity value between the first product identifier and a second product identifier; and
modifying, based on the at least one similarity value, at least one parameter in at least one data structure associated with the at least one product listing.

2. The system of claim 1, wherein the identifiable attributes comprise at least one of a brand, a product name, a specification, a keyword, and a model number.

3. The system of claim 1, wherein the first product identifier is generated through a text mapping process based on the product title.

4. The system of claim 1, wherein the at least one similarity value comprises a similarity value between the at least one tag of the first product identifier and at least one tag of the second product identifier.

5. The system of claim 1, wherein the at least one similarity value comprises at least one numerical similarity value and at least one categorical similarity value.

6. The system of claim 1, wherein the at least one similarity value comprises an indication of whether the first product identifier matches the second product identifier.

7. The system of claim 1, wherein flagging the first product identifier as having a quantity further comprises determining a price per unit associated with the first product identifier, and the comparison is further based on the price per unit.

8. The system of claim 1, wherein the operations further comprise publishing the at least one similarity value to one or more user devices.

9. The system of claim 1, wherein determining the third quantity comprises:
determining a relationship between the quantity-related tags based on the pattern;

determining the third quantity using a formula associated with the determined relationship.

10. The system of claim 1, wherein flagging the product identifier as having a quantity comprises modifying a parameter associated with the product identifier in the at least one data structure.

11. A computer-implemented method for extracting quantities from product titles, the method comprising:
- retrieving, from at least one product listing maintained on a website, text including a product title;
- preprocessing the text including the product title into identifiable attributes, wherein the preprocessing comprises at least one of tokenizing the product title or removing noise from the product title;
- retrieving a first product identifier comprising at least one tag extracted from the preprocessed text;
- generating, using the at least one tag and a machine-learning algorithm that relies on historical product title data and determines an optimal combination of attributes, a combination of the identifiable attributes;
- determining, a number of quantity related tags associated with the at least one tag;
- flagging the product identifier as having a first quantity if the number of quantity-related tags is zero, wherein the flagging comprises modifying a quantity parameter associated with the product identifier in at least one data structure;
- if the number of quantity-related tags is one:
  - consulting a probability table to determine a second quantity based on a unit associated with the quantity-related tag; and
  - flagging the first product identifier as having the second quantity, wherein the flagging comprises modifying a quantity parameter associated with the product identifier in at least one data structure;
- if the number of quantity-related tags is greater than one:
  - determining a third quantity based on a pattern associated with the quantity-related tags, and
  - flagging the first product identifier as having the third quantity, wherein the flagging comprises modifying a quantity parameter associated with the product identifier in at least one data structure;
- generating, based on the at least one tag, the combination of the identifiable attributes, and the flagged quantity, at least one similarity value between the first product identifier and a second product identifier; and
- modifying, based on the at least one similarity value, at least one parameter in at least one data structure associated with the at least one product listing.

12. The method of claim 11, wherein the identifiable attributes comprise at least one of a brand, a product name, a specification, a keyword, and a model number.

13. The method of claim 11, wherein the first product identifier is generated through a text mapping process based on the product title.

14. The method of claim 11, wherein the at least one similarity value comprises a similarity value between the at least one tag of the first product identifier and at least one tag of the second product identifier.

15. The method of claim 11, wherein the at least one similarity value comprises at least one numerical similarity value and at least one categorical similarity value.

16. The method of claim 11, wherein the at least one similarity value comprises an indication of whether the first product identifier matches the second product identifier.

17. The method of claim 11, wherein flagging the first product identifier as having a quantity further comprises determining a price per unit associated with the first product identifier, and the comparison is further based on the price per unit.

18. The method of claim 11, further comprising publishing the at least one similarity value to one or more user devices.

19. The method of claim 11, wherein determining the third quantity comprises:
- determining a relationship between the quantity-related tags based on the pattern;
- determining the third quantity using a formula associated with the determined relationship.

20. The method of claim 11, wherein flagging the product identifier as having a quantity comprises modifying a parameter associated with the product identifier in the at least one data structure.

* * * * *